United States Patent [19]
Ichikawa et al.

[11] Patent Number: 5,839,796
[45] Date of Patent: Nov. 24, 1998

[54] WHEEL COVER FOR USE IN AUTOMOBILE

[75] Inventors: Takashi Ichikawa; Yasuhide Narita, both of Aichi-ken, Japan

[73] Assignee: Kabushiki Kaisha Tokai Rika Denki Seisakusho, Aichi-ken, Japan

[21] Appl. No.: 700,554

[22] Filed: Aug. 16, 1996

[30] Foreign Application Priority Data

Aug. 21, 1995 [JP] Japan ................................. 7-211628
Aug. 25, 1995 [JP] Japan ................................. 7-217044
Mar. 14, 1996 [JP] Japan ................................. 8-057823
Mar. 14, 1996 [JP] Japan ................................. 8-057826

[51] Int. Cl.⁶ .................................................. B60B 7/10
[52] U.S. Cl. ..................................... 301/37.31; 301/37.34
[58] Field of Search ............................. 301/37.1, 37.31, 301/37.34, 37.35, 37.36, 37.42

[56] References Cited

U.S. PATENT DOCUMENTS

| | | | |
|---|---|---|---|
| 3,425,747 | 2/1969 | Alfes et al. | 301/37.1 |
| 3,746,397 | 7/1973 | Buerger | 301/37.1 |
| 3,868,147 | 2/1975 | Beisch | 301/37.31 |
| 3,918,763 | 11/1975 | Harris | 301/37.1 |
| 4,344,651 | 8/1982 | Apezynski | 301/37.1 |

*Primary Examiner*—Russell D. Stormer
*Attorney, Agent, or Firm*—Birch, Stewart, Kolasch & Birch, LLP

[57] ABSTRACT

A wheel cover which can be mounted on wheels having the same standardized diameter irrespective of types of the wheels. The wheel cover has a plurality of clips, for sandwiching a rim flange of the wheel, fixed at positions proximate to a peripheral edge of a disc-shaped wheel cover body, with the clips spaced at predetermined intervals. The clips and the wheel cover body are connected with each other through a plane fastener. A plurality of first plane members constituting the plane fastener is installed at positions proximate to the peripheral edge of the underside of the disc-shaped wheel cover body, with the first plane members spaced at predetermined intervals in the circumferential direction of the disc-shaped wheel cover body. A second plane member engaging the first plane member elastically is installed on each clip. Each clip has a sandwiching portion for sandwiching the rim flange elastically or by the clamping force of a screw means.

6 Claims, 20 Drawing Sheets

5,839,796

WHEEL COVER FOR USE IN AUTOMOBILE

BACKGROUND OF THE INVENTION

1. Field of the Invention

The present invention relates to a wheel cover and a wheel cover body to be mounted on a wheel of an automobile. More particularly, the present invention relates to a wheel cover which can be widely mounted on different types of wheels having the same standardized diameter.

2. Description of the Prior Art

FIG. 1 is a sectional view showing an ordinary steel wheel 1 and an enlarged view showing a rim 2 of the steel wheel 1. A projection called a hump is formed outward in the radial direction of the wheel 1 at a predetermined position of the rim 2 so as to prevent the edge of a tire from moving inward. The actual hump projects from the rim 2 only about 0.5 mm.

A wheel cover 50 to be mounted on the wheel 1 shown in FIG. 1 is constructed as shown in FIG. 2. That is, injection molding of a material is performed to form the wheel cover 50 comprising a disc-shaped wheel cover body 51 and a plurality of claws 52 integral with wheel cover body 51 and projecting from the underside thereof. The enlarged end 53 of the claw 52 is inserted into a concave formed on the underside of the hump 4 and pressed into the concave. That is, the enlarged end 53 of the claw 52 is pressed outward in the radial direction of the wheel 1, using a wire ring 70 so as to mount the wheel cover 50 on the wheel 1.

Meanwhile, many types of wheels are known. Wheels of the same diameter take a variety of constructions. In many cases, the position, depth, and size of the hump are different depending on types of wheels. Thus, a conventional wheel cover which is fixed to a wheel utilizing the hump is for the exclusive use of one type of wheel.

SUMMARY OF THE INVENTION

It is accordingly an essential object of the present invention to provide a wheel cover which can be mounted on wheels irrespective of types of the wheels if they have the same standardized diameter.

It is another object of the present invention to provide a wheel cover which can be manufactured at a low cost not by injection molding but by vacuum forming or press molding of a plate-shaped plastic material, using a die of a simple configuration.

It is another object to provide a wheel cover which comprises the wheel cover body in a simple shape, for example, a circular shape, and a connection means that is separately prepared to removably secure the wheel cover on a rim flange.

It is another object of the present invention to provide a wheel cover which can be mounted on the wheel easily because there is an allowable, namely, a wide range provided in the mounting position of the wheel cover on the wheel.

It is another object of the present invention to provide a wheel cover which allows the connection means to be easily mounted on the rim flange of the wheel and prevents the connection means such as a clip from being easily removed from the wheel, after the wheel cover has been mounted on the wheel by means of the connection means.

It is another object of the present invention to provide a wheel cover which allows the wheel cover body to be easily mounted on the connection means installed on the rim flange of the wheel.

It is another object of the present invention to provide a wheel cover having the connection means which minimizes the possibility that the peripheral portion of the wheel cover projects outward in the radial direction of the wheel, when the wheel cover has been mounted on the wheel.

It is still another object of the present invention to provide a wheel cover body decorated not by a conventional coating method but by a novel decoration method.

As described above, the positions of the humps are different from each other depending on types of wheels, even though the wheels have the same standardized diameter. But the sizes of the rim flanges, namely the outermost periphery of the rim, are substantially the same regardless of types of the wheels if the wheels have the same standardized diameter. Taking this into consideration, the present invention has been developed to solve the above-described problem. That is, the wheel cover of the present invention is mounted on a wheel, utilizing not the hump but the rim flange.

In order to accomplish the above objects, according to the present invention, there is provided a wheel cover to be applied to a wheel of an automobile which comprises a disc-shaped wheel cover body; a plurality of clips, for sandwiching a rim flange of the wheel, fixed at positions proximate to a peripheral edge of the disc-shaped wheel cover body, with the clips spaced at predetermined intervals; a plurality of first engaging means installed at positions proximate to a peripheral edge of an underside of the disc-shaped wheel cover body, with the first engaging means spaced at predetermined intervals in the circumferential direction of the disc-shaped wheel cover body; and a second engaging means installed on each clip so that the second engaging means engages the first engaging means. Preferably, three clips or more are used.

In the wheel cover having the above-described construction, the clips are mounted not on the hump of the rim of the wheel but on the rim flange. As described above, the positions and sizes of the rim flanges are substantially the same regardless of types of the wheels if the wheels have the same standardized diameter. Accordingly, the wheel cover of the present invention can be installed on wheels regardless of types if the wheels have the same standardized diameter. Further, the wheel cover can be mounted even on a wheel not having the hump formed thereon.

The clips can be installed at any positions of the rim flange in the circumferential direction thereof, even though balance weights are provided on the rim flange.

The clips are fixed at positions proximate to the peripheral edge of the disc-shaped wheel cover body. That is, unlike the conventional wheel cover, the wheel cover of the present invention is not required to be provided with a claw projecting from a position inward from the circumference of the wheel cover. Thus, the wheel cover body can be formed in a simple shape, namely, in a disc shape or a dish shape. Therefore, the wheel cover body can be manufactured not by injection molding but by vacuum forming or press molding of a plate-shaped material, using a die having a simple configuration. Thus, the wheel cover body can be manufactured at a low cost.

In the above construction, preferably, the first engaging means and the second engaging means consist of a first plane member and a second plane member, respectively constituting a plane fastener.

The plane fastener described in the specification comprises two substantially flat plate-shaped plane members having a connection means, namely, the engaging means formed on the surface thereof, respectively. The two plane members are removably connected with each other through the connection means when the connection means are pressed against each other. For example, as the connection means, a large number of mushroom-shaped projections elastically deformable are densely formed on the upper surface of each of the two plane members. When the two plane members are pressed against each other with the mushroom-shaped projections in contact with each other, the heads of the mushroom-shaped projections engage each other. Consequently, unless an external force is applied to the two plane members with a considerable strength, they are not disengaged from each other. As another connection means, the construction of a VELCRO fastener (synthetic materials which adhere when pressed together) may be utilized. That is, a large number of loops are formed on the upper surface of one of the two plane members and a large number of hooks capable of engaging the loops are formed on the upper surface of the other plane member. As still another connection means, a double bond tape which can be repeatedly used may be installed on the underside of the wheel cover body or on the upper surface of one of the two plane members. The use of the double bond tape eliminates the need for the use of one of the two plane members.

When the plane fastener is used, the wheel cover can be mounted on the rim flange, the first plane member fixed to the underside of the wheel cover body and the second plane member installed on the rim flange can be connected with each other when the overlap area between the first plane member and the second plane member exceeds more than a predetermined value. In other words, some degree of dislocation between the first and second plane members can be absorbed. This is advantageous in manufacturing (mounting of the first plane member on the wheel cover body) the wheel cover and mounting the wheel cover on the rim flange.

The first engaging means may consist of a male snap engaging means and the second engaging means consists of a female snap engaging means. Further, the male snap engaging means and the female snap engaging means may be composed of a material different from that of the clip and include a snap button composed of a male button and a female button capable of engaging the male button. Still further, the male snap engaging means may include a projection having a spherical portion at a lower end thereof; and the female snap engaging means includes a groove or a hole into which the spherical portion is engagedly inserted.

In the above construction, preferably, each clip has a sandwiching portion for sandwiching the rim flange of the wheel elastically. Further, the sandwiching portion of each clip preferably comprises an outer wall and an inner wall curved in correspondence to the curved rim flange of the wheel so as to sandwich the rim flange of the wheel therebetween. In the construction in which the clip is fixed to the rim flange of the wheel through the sandwiching portion consisting of the outer curved wall and the inner curved wall, the rim flange is inserted between the outer curved wall and the inner curved wall in a direction corresponding to the curve of the clip and that of the rim flange. Thus, the clip can be mounted on the rim flange easily. Further, even though the wheel cover body fixed to the clip is pulled in the radial direction of the wheel, the clip is not removed from the rim flange easily because the direction in which the wheel cover body is pulled is different from the curved direction of the rim flange.

In the above construction, each clip may have a pedestal formed continuously with the sandwiching portion; the pedestal has a flat portion having the second engaging means formed thereon; and the flat portion extends in parallel with a wheel cover surface and inward in the radial direction of the wheel. With this construction, preferably, each clip has a supporting leg extending in proximity to an inner surface of the rim when the wheel cover has been mounted on the wheel.

The clip may include a screw means which applies a force for sandwiching the rim flange of the wheel between the screw means and a part of the clip. Further, each clip comprises a clip body and a screw means. The clip body includes an outer curved wall curved along an outer surface of the rim flange; a plane portion which extends from an edge of the outer curved wall in parallel with the surface of the wheel cover and inward in the radial direction of the wheel and on which the second engaging means is mounted; and a supporting leg extending from the plane portion to the vicinity of the inner surface of the rim when the wheel cover has been mounted on the wheel. The screw means is screwed into a screw hole formed on the supporting leg, thus pressing the rim flange of the wheel against the outer curved wall.

In the construction in which the second engaging means is mounted on the plane portion extending inward in the radial direction of the wheel and in parallel with the wheel cover surface, the greater part of the clip is positioned inward from the rim flange in the radial direction of the wheel when the wheel cover has been mounted on the wheel. That is, the part of the clip present outward (namely, side at which a tire is positioned) from the rim flange in the radial direction of the wheel is much smaller than that present inward from the rim flange in the radial direction thereof. That is, the deformation of the tire has a small degree of influence on the clip while a car is traveling.

When the first engaging means fixed to the wheel cover body has engaged the second engaging means provided on the clip in the operation of mounting the wheel cover on the wheel, the supporting leg of the clip extending from the plane portion contacts the inner surface of the rim. As a result, a reactive force is generated against a load generated by the engagement between the first and second engaging means. Therefore, the first and second plane members can be easily connected with each other. That is, the wheel cover can be easily mounted on the wheel.

Preferably, the sandwiching portion of each clip includes an elastic thin plate, composed of a material different from that of the pedestal, for elastically sandwiching the rim flange of the wheel and a part of the clip between two legs thereof. Preferably, the elastic thin plate consists of a metal plate, and the pedestal is made of synthetic resin.

In this construction, the part of the clip present outward from the rim flange in the radial direction of the wheel in this construction is much smaller. Therefore, in this construction, the deformation of the tire has a smaller degree of influence on the clip while the car is traveling.

A top surface of a connection wall connecting the outer curved wall and the inner curved wall with each other may be parallel with the surface of the wheel cover; and the second engaging means may be mounted on the top surface of the connection wall.

When the clip has the sandwiching portion for sandwiching the rim flange of the wheel by means of the clamping force of the screw means, the clip main body composed of the curved wall, the plane portion, and the supporting leg is made of a thin material, for example, a metal plate so as to allow the curved wall curved along the outer surface of the rim flange to be thin. This construction has an effect similar to that of the above-described constructions.

As described above, the wheel cover body can be allowed to be formed in a simple shape, namely, in a disc shape or a dish shape by using the separate fixing means such as the clip, the first engaging means, and the second engaging means.

Accordingly, there is provided a wheel cover body for use in an automobile formed by molding a three-laminate sheet comprising a transparent protection layer, a decoration layer, and a heat-resistant reinforcing layer into a wheel cover. The three-laminate sheet may be molded by vacuum forming method or press molding method to form the wheel cover body.

As well known, without exception, the conventional wheel cover is manufactured through at least injection molding and coating process. In the coating process, the surface of the wheel cover which has been formed by injection molding is coated to decorate it.

Unlike the conventional art, according to the wheel cover having the above-described construction, the decoration layer is entirely covered with the transparent protection layer. Therefore, the pattern of the decoration layer looks deep through the transparent protection layer. That is, the wheel cover of the present invention has a superior decorative effect. Further, because the decoration layer is entirely covered with the transparent protection layer, whereas in the conventional wheel cover, there is a possibility that paint is peeled off from the decoration layer. Further, because the above-described construction of the wheel cover can be formed without carrying out coating process, problems of coating unevenness or the like do not occur, unlike the conventional wheel cover. Furthermore, the wheel cover having the above-described construction can be formed by vacuum forming or press molding of the three-layer laminate sheet, the cost required to manufacture the wheel cover of the present invention is about ⅓ or ¼ as low as that to be required by the conventional manufacturing method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE INVENTION

The detailed description of the wheel cover according to the preferred embodiments of the present invention will be described below with reference to FIGS. 3 through 11. The first embodiment will be described below with reference to FIGS. 3 through 23.

Figure 3:
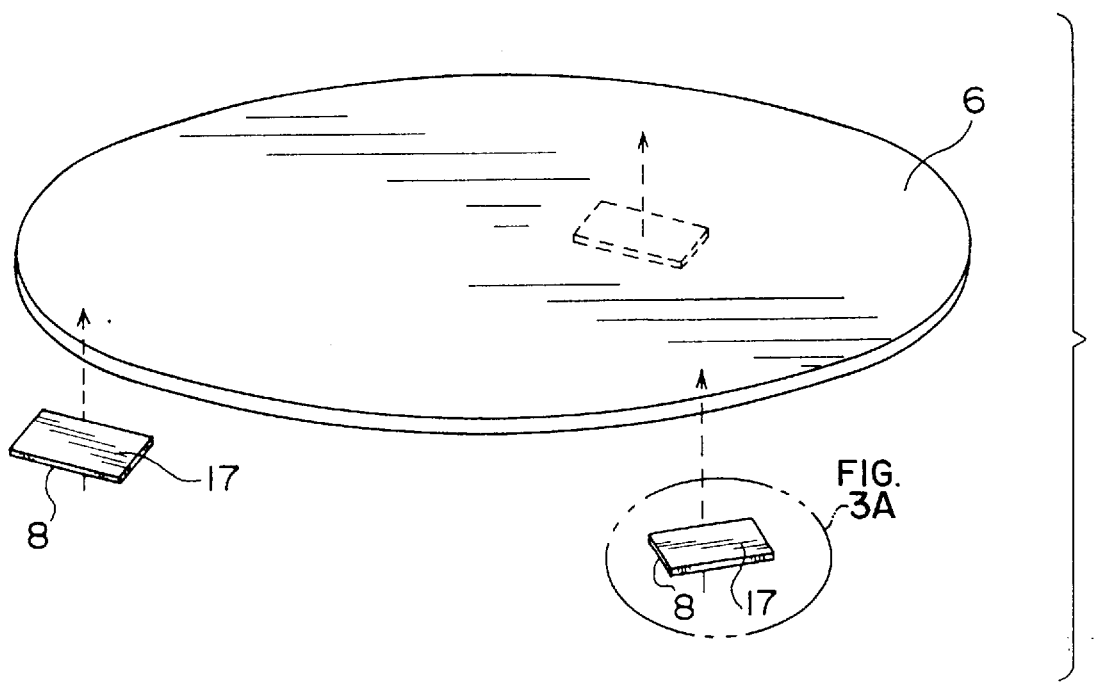
FIG. 3 is a perspective view showing a wheel cover body according to a first embodiment of the present invention.
Figure 3A:
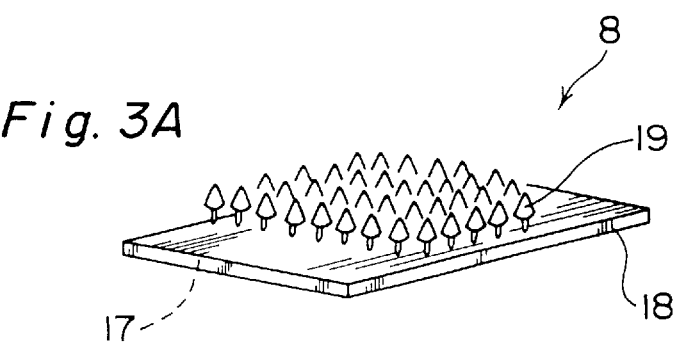

The wheel cover of the first embodiment comprises clips fixed to the underside of a disc-shaped wheel cover body at positions proximate to the circumference of the disc-shaped wheel cover body, utilizing a plane fastener. FIG. 3 shows an example of the wheel cover body. Three connection strips 8 constituting a plane fastener are fixed to the underside of a disc-shaped wheel cover body 6 by arranging them a little inward from the circumference of the wheel cover body 6 and spacing them at regular intervals in the circumferential direction thereof. With reference to the lower drawing in FIG. 3 showing the enlarged connection strip 8, the connection strip 8 comprises a rectangular substrate 18 and a large number of mushroom-shaped projections 19 densely formed on the upper surface of the substrate 18. The connection strip 8 is bonded to the underside of the disc-shaped wheel cover body 6 with adhesive agent applied to the underside 17 of the substrate 18. The connection strip 8 may be welded to the underside of the disc-shaped wheel cover body 6. As will be described later, each connection strip 8 is connected with a flat plate 11 of a clip by means of a large number of mushroom-shaped projections densely formed thereon.

Figure 4:
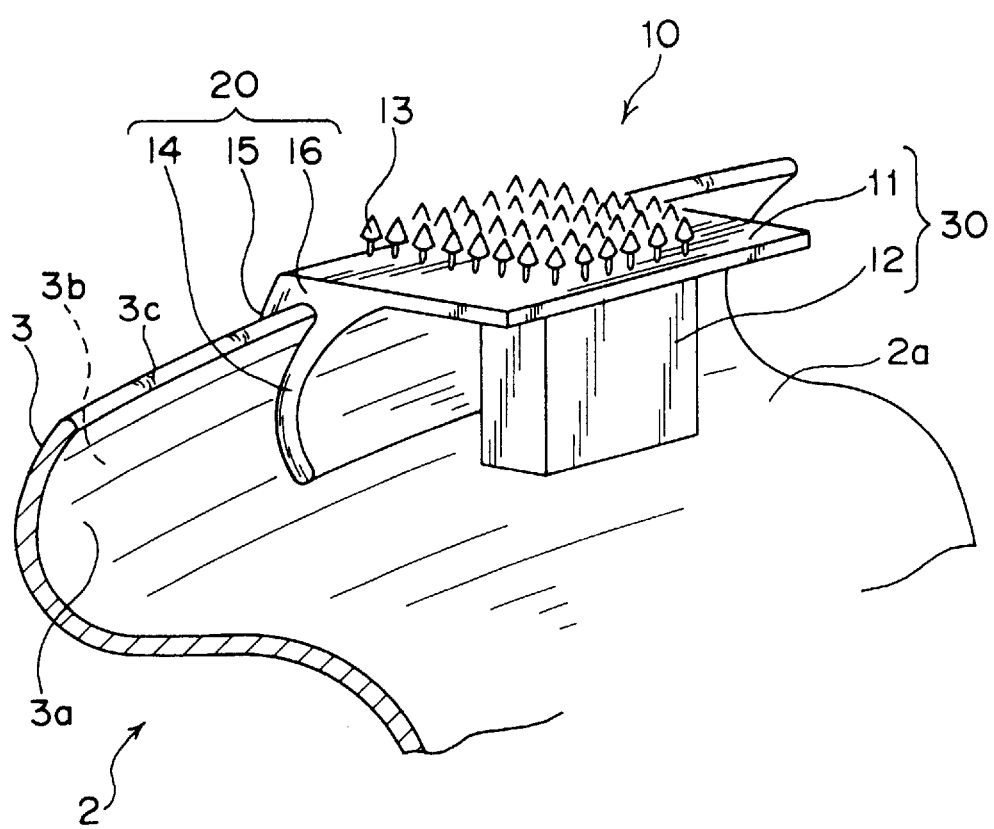
FIG. 4 is a perspective view showing a clip to be mounted on the wheel cover body shown in FIG. 3 has been installed on a rim flange.

FIG. 4 shows a clip 10 mounted on a rim flange 3 of a wheel 1. As shown in FIG. 4, the clip 10 comprises a sandwiching portion 20 sandwiching the rim flange 3 of the wheel 1 between first and second curved wall 14 and 15 thereof; and a pedestal 30 comprising the flat plate 11 to be connected with the connection strip 8 bonded to the underside of the wheel cover body 6.

The sandwiching portion 20 comprises the first curved wall 14 curved along the "inner" (described below) surface 3a of the rim flange 3 curved in the sectional direction of the axis of the wheel 1; the second curved wall 15 curved along the "outer" (described below) surface 3b of the rim flange 3 curved in the sectional direction of the axis of the wheel 1; and a connection portion 16 to be placed on the circumferential edge 3c of the rim flange 3 and interposed between the first curved wall 14 and the second curved wall 15. The above expressions "inner" and "outer", mean the inner side and the outer side of the wheel 1 in relation to the radial direction thereof, respectively. The clip 10 is slightly curved in the longitudinal direction thereof in correspondence to the rim flange 3 curved in its circumferential direction.

Figure 5:
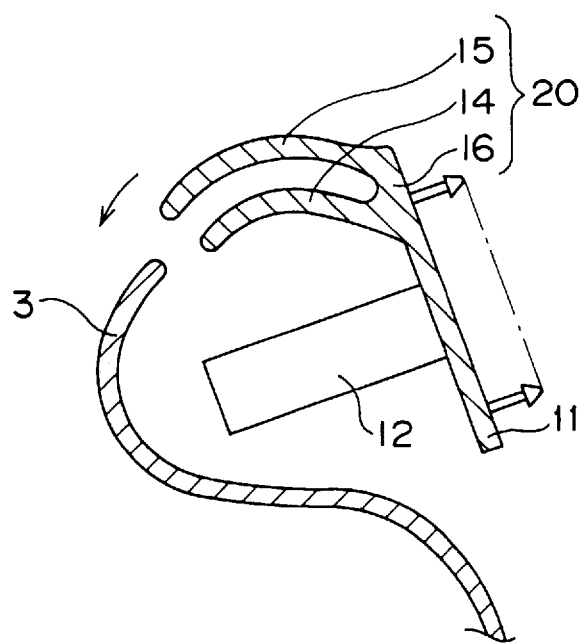
FIG. 5 is a sectional view for describing a method of mounting the clip shown in FIG. 4 on the rim flange.

The clip 10 is made of a material such as plastic having a certain degree of elasticity. As shown in FIG. 5, the clip 10 is mounted on the rim flange 3 as follows: The rim flange 3 is inserted into the groove between the first curved wall 14 and the second curved wall 15 and then. That is, the sandwiching portion 20 is moved in a direction shown by an arrow along the rim flange 3 curved in the sectional direction of the axis of the wheel 1. In this mounting operation, the first curved wall 14 and second curved wall 15 sandwich the rim flange 3 therebetween owing to the elastic force thereof. In this manner, the clip 10 is fixed to the rim flange 3.

As shown in FIG. 4, the pedestal 30 comprises the rectangular flat plate 11 parallel with the wheel cover surface and projecting inward in the radial direction of the wheel 1 from the connection portion 16 of the sandwiching portion 20; and a columnar supporting leg 12 extending at a right angle with the flat plate 11 from the underside of the flat plate 11 toward the inner surface 2a of the wheel rim. A large number of mushroom-shaped projections 13 are densely formed on the upper surface of the flat plate 11, similarly to the mushroom-shaped projections 19 of the connection strip 8 fixed to the underside of the wheel cover body 6.

Figure 6:
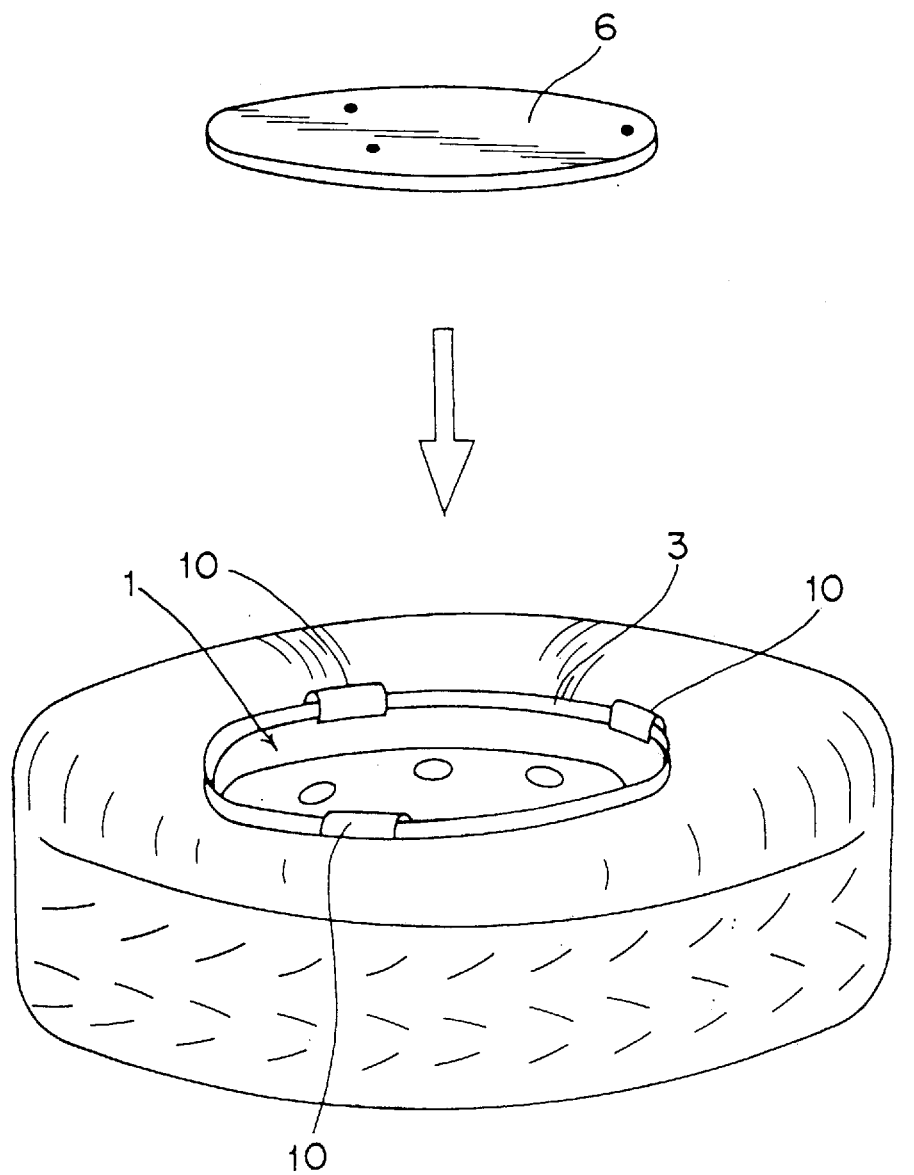
FIG. 6 shows the position relationship among the wheel cover body, the clip, and the wheel in mounting the wheel cover on the wheel.

FIG. 6 shows the position relationship among the wheel cover body 6, the clips 10, and the wheel 1 in mounting the wheel cover on the wheel 1. Black dots shown on the wheel cover body 6 in FIG. 6 indicate the positions at which the connection strips 8 are mounted. The pedestal 30 of the clip 10 is not shown in FIG. 6.

In order to mount the wheel cover on the wheel 1 stably, preferably, at least three clips 10 are mounted on the disc-shaped wheel cover body 6 at regular intervals in the circumferential direction thereof. If balance weights installed on the upper surface of the rim flange 3 prevents the clips 10 from being mounted thereon at regular intervals, preferably, they are arranged thereon at the possible most regular intervals in such a manner that the clips 10 do not contact the balance weights.

As shown in FIG. 6, in order to mount the wheel cover on the wheel 1, preferably, each clip 10 of the wheel cover is fixed to the rim flange 3 of the wheel 1 and then, each connection strip 8 fixed to the underside of the wheel cover body 6 is connected with the flat plate 11 of the pedestal 30 of the clip 10 by means of the mushroom-shaped projections 19 and 13. In this case, as indicated in FIG. 4, when the connection strip 8 presses the flat plate 11 downward, the lower end 12a of the columnar supporting leg 12 extending from the underside of the flat plate 11 toward the inner surface 2a of the rim flange 3 contacts the inner surface 2a. As a result, a reactive force is generated against the pressing force applied to the flat plate 11 by the connection strip 8, thus allowing the connection strip 8 and the flat plate 11 to be easily connected with each other.

The connection strip 8 fixed to the underside of the disc-shaped wheel cover body 6 and the flat plate 11 of the clip 10 constitute a so-called plane fastener. That is, when the connection strip 8 is pressed against the flat plate 11, with the mushroom-shaped projections 19 of the former and the mushroom-shaped projections 13 of the latter in contact with each other, the mushroom-shaped projections 13 and 19 are deformed elastically and heads thereof engage each other. Consequently, unless an external force is applied thereto with a considerable strength, they are not disengaged from each other. That is, the wheel cover is firmly fixed to the wheel 1, as shown in FIG. 7.

Figure 7:
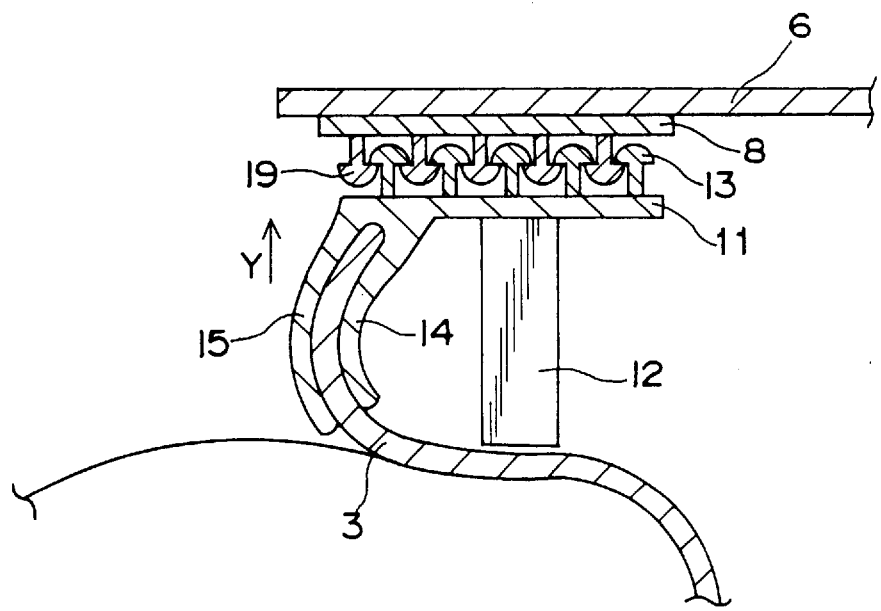
FIG. 7 is sectional view showing a state in which the wheel cover has been installed on the wheel by using the clip of FIG. 4.

In the example shown in FIGS. 4 and 7, the mushroom-shaped projections 13 are formed integrally with the flat plate 11. That is, the flat plate 11 constitutes one of the two plane members of the plane fastener. But a member, namely, the mushroom-shaped projections similar to the mushroom-shaped projections 19 of the connection strip 8 may be bonded or welded to the upper surface of the flat plate 11.

In the example shown in FIGS. 3, 4, and 7, a large number of mushroom-shaped projections 19 and 13 capable of engaging each other are densely formed on each of the connection strip 8 and the flat plate 11 constituting the other plane member of the plane fastener. As another example of engaging means, it is possible to adopt the construction of VELCRO fasteners. That is, a large number of loops may be formed on the connection strip 8 (or the flat plate 11), while a large number of hooks which can engage the loops may be formed on the flat plate 11 (or the connection strip 8). As still another example of engaging means, a double bond tape which can be repeatedly used may be installed on the underside of the disc-shaped wheel cover body 6 or on the upper surface of the flat plate 11 of the clip 10 so as to fix the wheel cover to the wheel 1.

As described above, the sandwiching portion 20 is fixed to the rim flange 3 by means of the first curved wall 14 and the second curved wall 15 which sandwich the rim flange 3 therebetween owing to the elastic force thereof. Thus, if there is a dislocation in the circumferential direction of the wheel 1 between the connection strip 8 fixed to the wheel cover body 6 and the flat plate 11 of the clip 10, the dislocation can be corrected by sliding the clip 10 along the rim flange 3 in the circumferential direction thereof. The connection strip 8 and the flat plate 11 can be connected with each other when the overlap area between the mushroom-shaped projections 19 and 13 formed thereon exceeds more than a predetermined range. Thus, it is not necessary to adjust the position of the connection strip 8 and the flat plate 11 so that almost all of the mushroom-shaped projections 19 and 13 engage each other in correcting the relative positions thereof. Similarly, if there is a dislocation in the radial direction of the wheel 1 between the connection strip 8 and the flat plate 11, they can be connected with each other when the mushroom-shaped project ions 19 and 13 formed thereon engage with each other in some extent. Thus, it is not necessary to change the relative positions of the connection strip 8 and the flat plate 11 if the mushroom-shaped projections 19 and 13 are in engagement with each other in some extent.

Figure 1A:
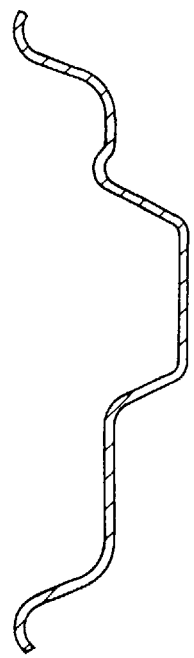
FIG. 1 is a schematic sectional view showing an ordinary wheel and an enlarged view showing its rim.
Figure 1:
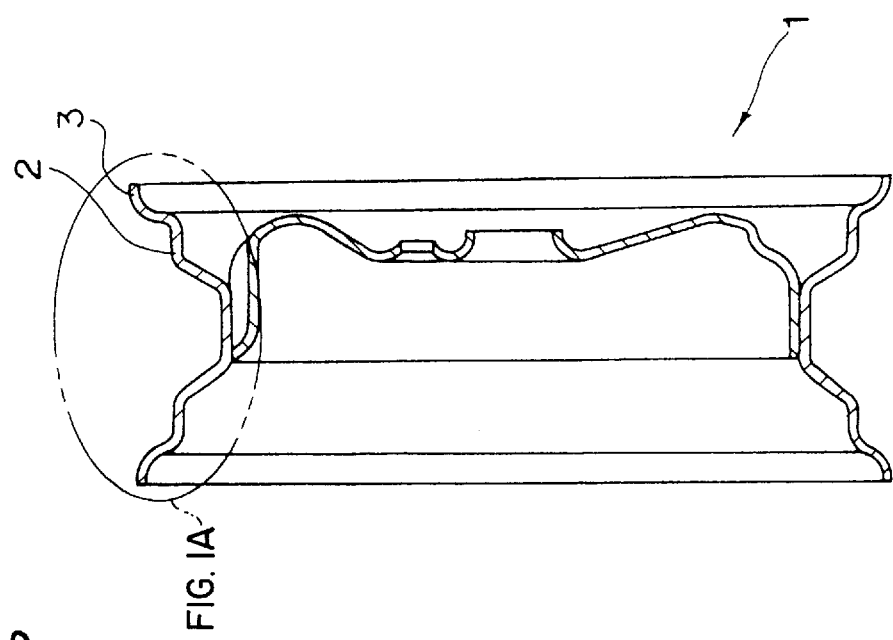
Figure 2:
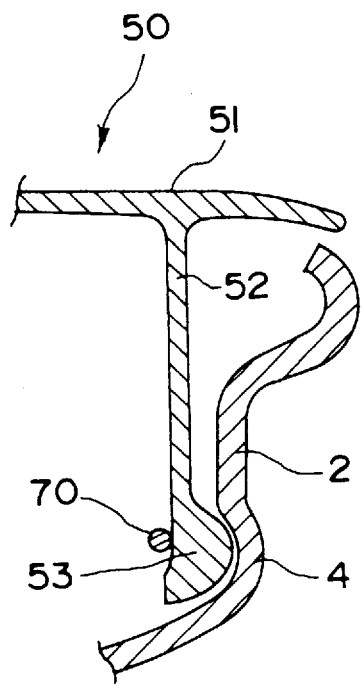
FIG. 2 is a partial sectional view showing a conventional wheel cover mounted on the wheel shown in FIG. 1.

As indicated in FIGS. 3 and 6, the wheel cover body 6 is disc-shaped and has a simple construction, while the conventional wheel cover 50 shown in FIG. 2 has the claw 52 projecting from the inner peripheral surface of the wheel cover 50. Thus, the wheel cover body 6 can be manufactured not by injection molding but by vacuum forming by using a die having a simple construction.

Further, as shown in FIG. 7, in mounting the wheel cover on the wheel 1, most of the component parts of the clip 10 are positioned at the inner side (right-hand side in FIG. 7) of the rim flange 3 in the radial direction of the wheel 1, while only the second curved wall 15 is positioned outward (left-hand side in FIG. 7, side at which a tire is installed) from the rim flange 3 in the radial direction of the wheel 1. That is, the deformation of the tire has a small degree of influence on the clip 10 while a car is traveling.

It is preferable that the component parts of the clip 10 are positioned at the outer side of the rim flange 3 at a low percentage in the radial direction of the wheel 1, in considering the influence to be given by the tire during the travel of the car. A clip 10' formed in consideration of the influence to be given by the tire will be described below with reference to FIGS. 8 and 9 as the second embodiment of the present invention.

Figure 8:
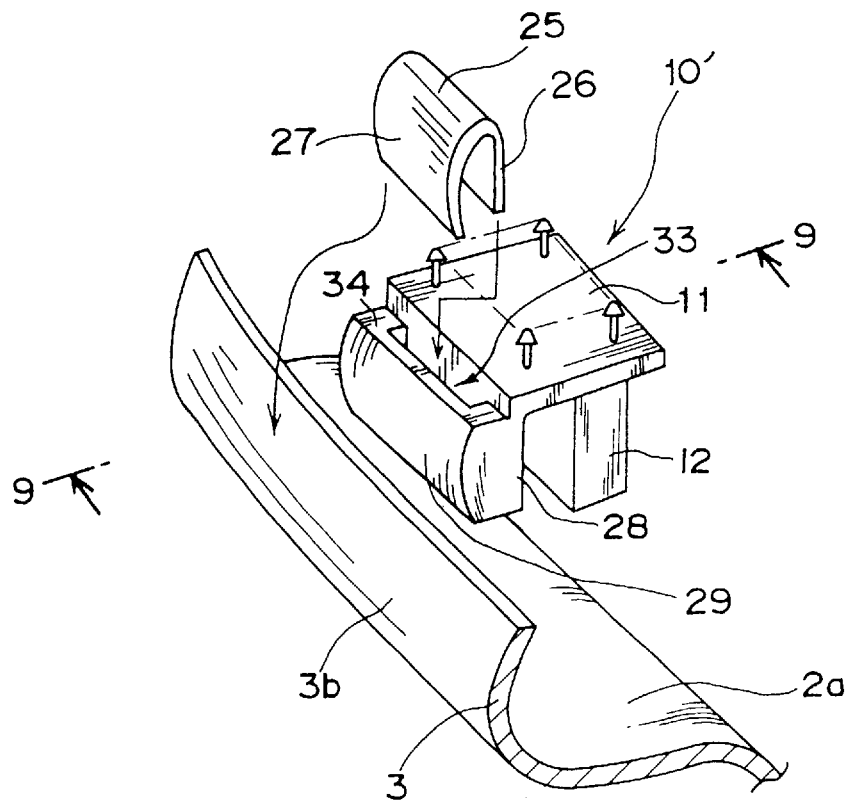
FIG. 8 is a perspective view showing a clip according to a second embodiment of the present invention.
Figure 9:
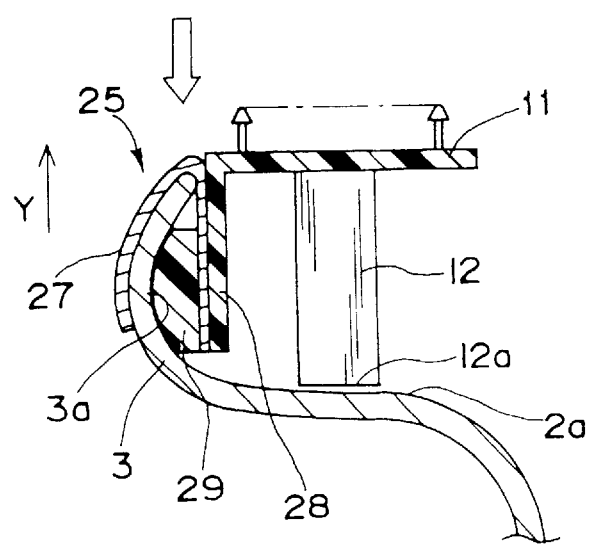
FIG. 9 is a sectional view, taken along a line 9—9 of FIG. 8, showing a state in which the clip shown in FIG. 8 has been mounted on the rim flange.

FIG. 8 is a perspective view showing a method of mounting the clip 10' on the rim flange 3. FIG. 9 is a sectional view, taken along a line 9—9 of FIG. 8, showing the clip 10' mounted on the rim flange 3. The construction of the clip 10' is different from that of the clip 10 of the first embodiment only at a portion corresponding to the sandwiching portion 20 of the clip 10. Therefore, the portion corresponding to the sandwiching portion 20 is described below.

As shown in FIG. 8, the clip 10' comprises a wall 28 extending downward from the outer end of the flat plate 11 in the radial direction of the wheel 1; a bulgy portion 29 bulging outward in the radial direction of the wheel 1 from a position located a little downward from the upper end of the wall 28 and contacting the inner surface 3a of the rim flange 3 when the clip 10' is mounted thereon; and an insertion opening 33 which is located in approximately the center of the upper surface 34 of the bulgy portion 29 and receives one leg 26 of a metal fitting 25.

As shown in FIG. 8, the metal fitting 25 is approximately U-shaped sectionally in the radial direction of the wheel cover and has a predetermined length in the circumferential direction of the rim flange 3. The leg 26 of the metal fitting 25 is flat in correspondence to the flat wall 28 of the clip 10', while the other leg 27 of the metal fitting 25 is curved in correspondence to the curved outer surface 3b of the rim flange 3.

Using the metal fitting 25, the clip 10' is mounted on the rim flange 3 of the wheel 1. The method of mounting the clip 10' on the rim flange 3 is performed as follows: First, the clip 10' is placed inward from the rim flange 3, with the bulgy portion 29 in contact with the inner surface 3a of the rim flange 3 and the lower end 12a of the supporting leg 12 in contact with the inner surface 2a of the rim. Then, the metal fitting 25 is pressed downward as shown by an arrow in FIG. 8. That is, the metal fitting 25 is moved downward to insert the leg 26 thereof into the insertion opening 33 formed in the bulgy portion 29 and at the same time, cover the outer surface 3b of the rim flange 3 with the curved leg 27, as shown in FIG. 9. As a result, the metal fitting 25 sandwiches the bulgy portion 29 of the clip 10' and the rim flange 3 between its legs 26 and 27 by the elastic force thereof, thus fixing the clip 10' to the rim flange 3. As shown in FIGS. 8 and 9, the outer surface of the bulgy portion 29 is curved in correspondence to the curved inner surface 3a of the rim flange 3.

The metal fitting 25 consists of a comparatively thin metal plate, whereas the second curved wall 15 of the sandwiching portion 20 integral with the clip 10 according to the first embodiment is made of plastic. Therefore, the curved leg 27 of the metal fitting 25 can be formed thinner than the second curved wall 15. That is, when the clips 10 and 10' are mounted on the rim flange 3, the volume of the curved leg 27 outward from the rim flange 3 in the radial direction of the wheel 1 is smaller than that of the second curved wall 15 outward from the rim flange 3 in the radial direction thereof. Therefore, the degree of influence to be given to the clip 10' by the tire is smaller than that to be given to the clip 10 while the car is traveling.

Figure 10:
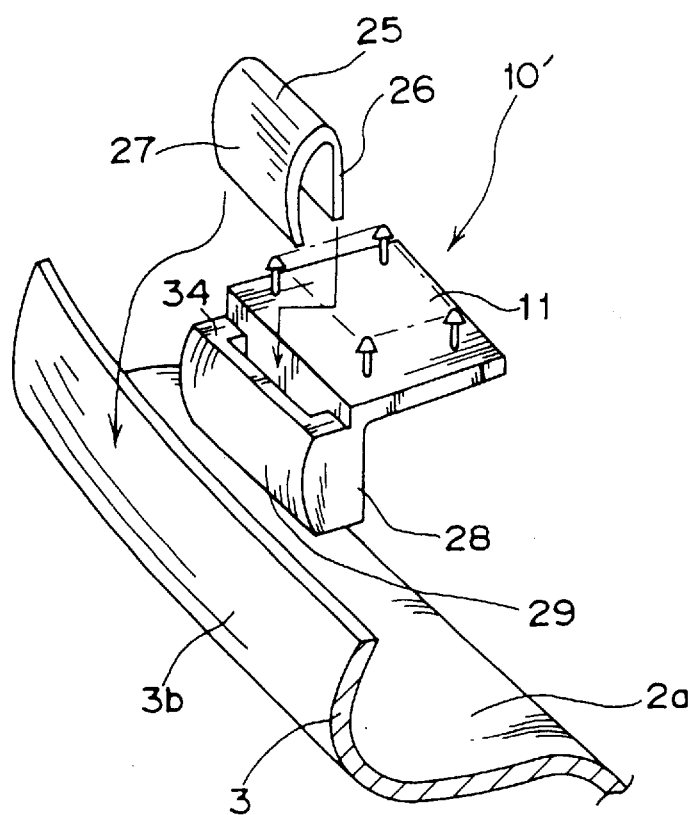
FIG. 10 is a perspective view showing a modification of the clip shown in FIG. 8.
Figure 17:
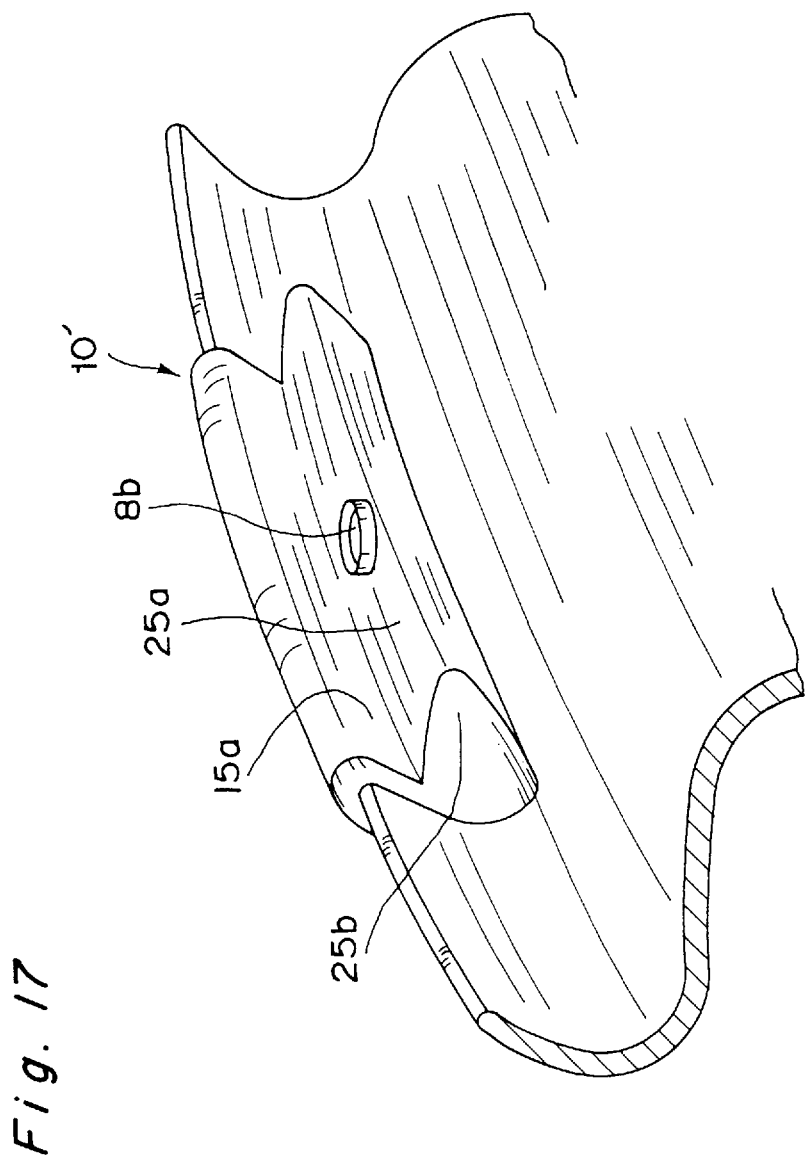
FIG. 17 is a perspective view showing another example of clip, according to the present invention, which has been mounted on the rim flange.

In the first and second embodiments, the clips 10 and 10' comprise the supporting leg 12. But if the rigidity of the entire clip is high, the formation of the supporting leg 12 can be omitted, as shown in FIG. 10. Further, as shown in FIG. 17, the flat plate 11 may be thickly formed so that it may serve as the supporting leg of the flat plate 11.

In the first and second embodiments, when an external force in the axial direction (Y shown in FIG. 9) of the wheel 1 is applied to the wheel cover body 6 installed on the wheel 1, the sandwiching portion 20 of the first embodiment and the metal fitting 25 of the second embodiment prevent the wheel cover body 6 from being removed from the wheel 1 in the axial direction (Y) because the former and the latter comprise the curved walls 14 and 15 and the curved leg 27, respectively.

Figure 11:
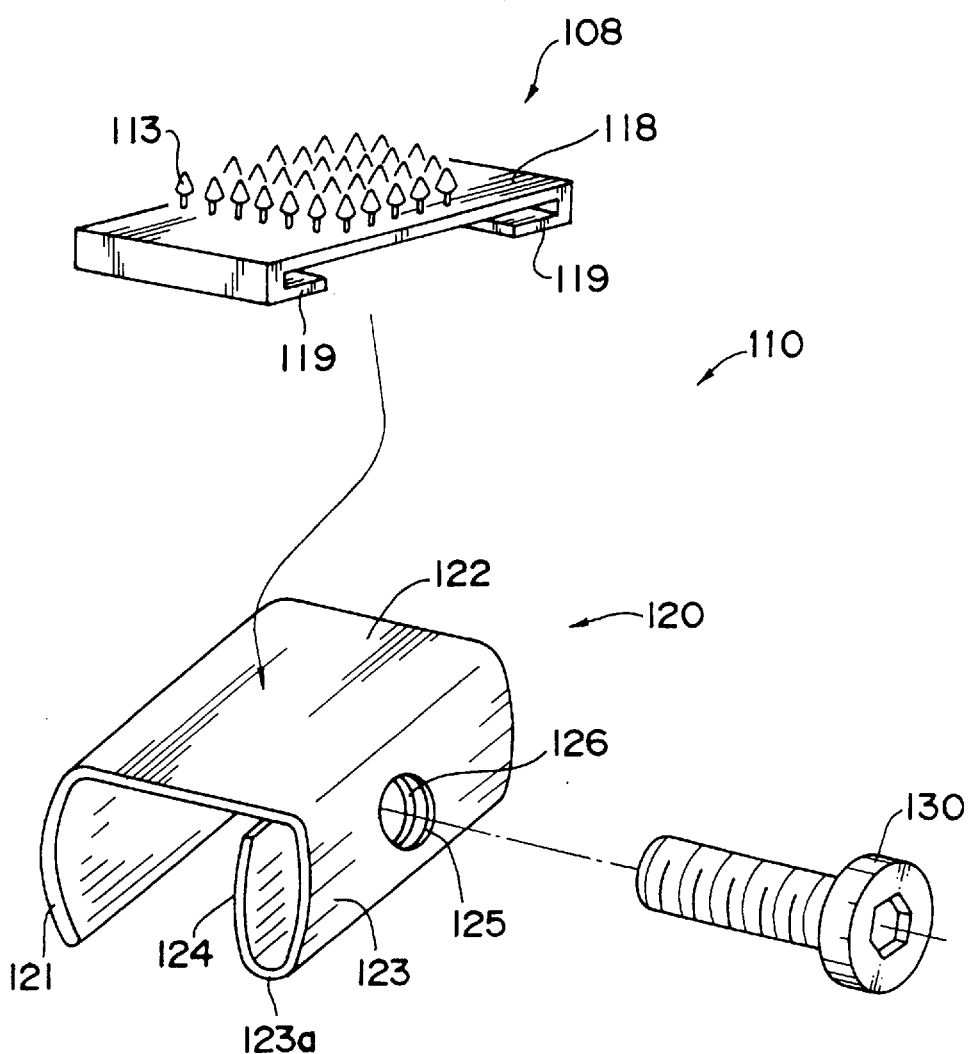
FIG. 11 is an exploded perspective view showing a clip according to a third embodiment of the present invention.
Figure 12:
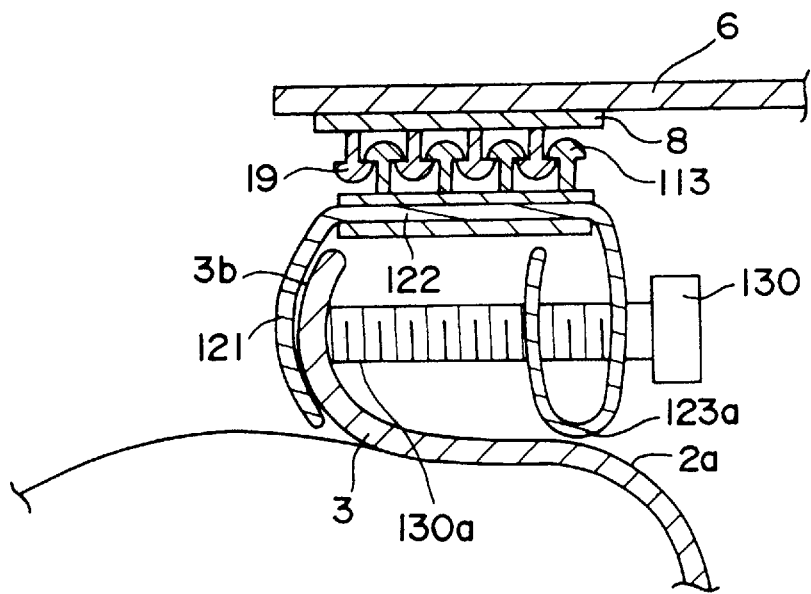
FIG. 12 is a sectional view showing a state in which the clip shown in FIG. 11 has been mounted on the rim flange.

FIGS. 11 and 12 show a wheel cover of the third embodiment of the present invention. In the first and second embodiments, the sandwiching portion of the clip sandwiches the rim flange 3 of the wheel 1 elastically, whereas in the third embodiment, the rim flange 3 is sandwiched between a curved wall and bolt, utilizing the clamping force of a screw means. The constructions of other constituent parts and the operation of the wheel cover of the third embodiment are similar to the construction and the operation of the wheel cover of the first and second embodiment.

FIG. 11 is an exploded perspective view for describing the entire construction of a clip 110 of the third embodiment. FIG. 12 is a sectional view showing a state in which the wheel cover having the clip 110 mounted thereon has been fixed to the wheel, thus corresponding to FIG. 7.

The clip 110 shown in FIG. 11 comprises a curved clip body 120 formed by a metal plate; and a bolt 130. A connection strip 108 comprises a substrate 118 and a large number of mushroom-shaped projections formed densely on the substrate 118. The connection strip 108 is mounted on the clip body 120.

The clip body 120 comprises a curved wall 121 which is curved along the curved outer surface 3b of the rim flange when the wheel cover body 6 is installed on the wheel 1; a plane portion 122 extending inward in the radial direction of the wheel 1 from the upper edge of the curved wall 121 and in parallel with the wheel cover surface; and a supporting plate 123 folded downward from one edge of the plane portion 122 in the direction in which the curved wall 121 extends. A folded portion 124 is formed upward from the lower end of the supporting plate 123. The upper end of the folded portion 124 is proximate to the underside of the plane portion 122. A screw hole 125 is formed at approximately the center of the supporting plate 123, and a screw hole 126 is formed at approximately the center of the folded portion 124. A screw or the bolt 130 is screwed into the screw holes 125 and 126.

As shown in FIG. 12, the clip 110 sandwich the rim flange 3 between the bolt 130 and the curved wall 121 by the clamping force of the bolt 130. That is, the bolt 130 screwed into the screw hole 125 of the supporting plate 123 and into the screw hole 126 of the folded portion 124 is tightened, with the curved wall 121 placed on the outer surface 3b of the rim flange 3. As a result, the front end 130a of the bolt 130 presses the rim flange 3 against the curved wall 121. Consequently, the clip 110 is fixed to the rim flange 3.

The supporting plate 123 and the folded portion 124 correspond to the supporting leg 12 (see FIGS. 4 and 9) of the clip according to the first and second embodiments. That is, when the connection strip 8 presses the connection strip 108 downward, the curved portion 123a interposed between the supporting plate 123 and the folded portion 124 contacts the inner surface 2a of the rim flange 3. As a result, a reactive force is generated against the pressing force applied to the connection strip 108 by the connection strip 8.

Opposed side walls of the substrate 118 of the connection strip 108 are folded downwardly inwardly to form a pair of folded portions 119. The folded portions 109 are elastically engaged by the corresponding sides of the clip body 120 to fix the connection strip 108 to the clip body 120.

In the example shown in FIG. 11, the connection strip 108 separately prepared is mounted on the clip body 120 made of metal, but the sandwiching portion may be formed integrally with the connection strip 108 by molding a plastic material. As described previously, the sandwiching portion consisting of a metal plate allows the volume of the clip 110 at the outer side of the rim flange 3 in the radial direction of the wheel 1 to be smaller when the clip 110 is mounted on the rim flange 3. Consequently, a small degree of influence is given to the clip 110 by the tire while the car is traveling.

The wheel cover body according to the fourth embodiment will be described below with reference to FIGS. 13 through 18.

Figure 13:
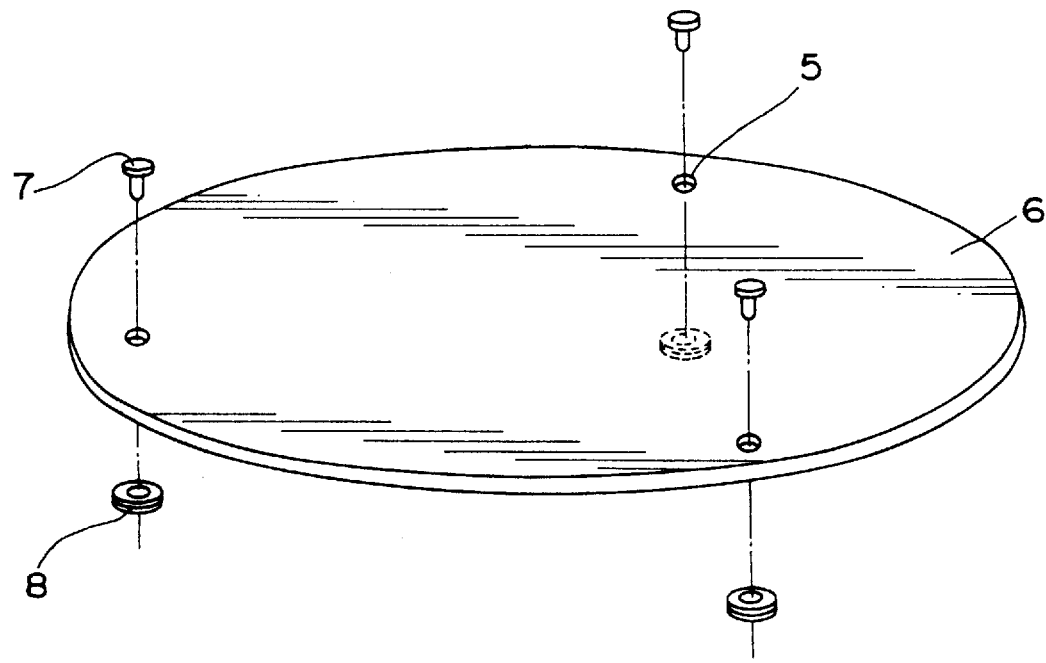
FIG. 13 is a perspective view showing a wheel cover body according to a fourth embodiment of the present invention.

The wheel cover according to the fourth embodiment comprises snap engaging means adopted as first and second engaging means. As the snap engaging means, a snap button 80 (see FIG. 16) comprising a male button (male engaging portion) 8a and a female button (female engaging portion) 8b are used to fix clips 10 at positions proximate to the circumference of the disc-shaped wheel cover body 6. FIG. 13 shows an example of the wheel cover body 6. Three male buttons 8a constituting the snap button are fixed to the underside of the disc-shaped wheel cover body 6 such that they are positioned a little inward from the circumference of the wheel cover body 6 and spaced at regular intervals in the circumferential direction thereof. Each male button 8a is mounted on the wheel cover body 6 by caulking a pin 7 inserted into a hole 5 formed on the wheel cover body 6 and a hole formed on the male button 8a. The male button 8a engages the female button 8b fixed to the clip 10, as will be described later.

Figure 14:
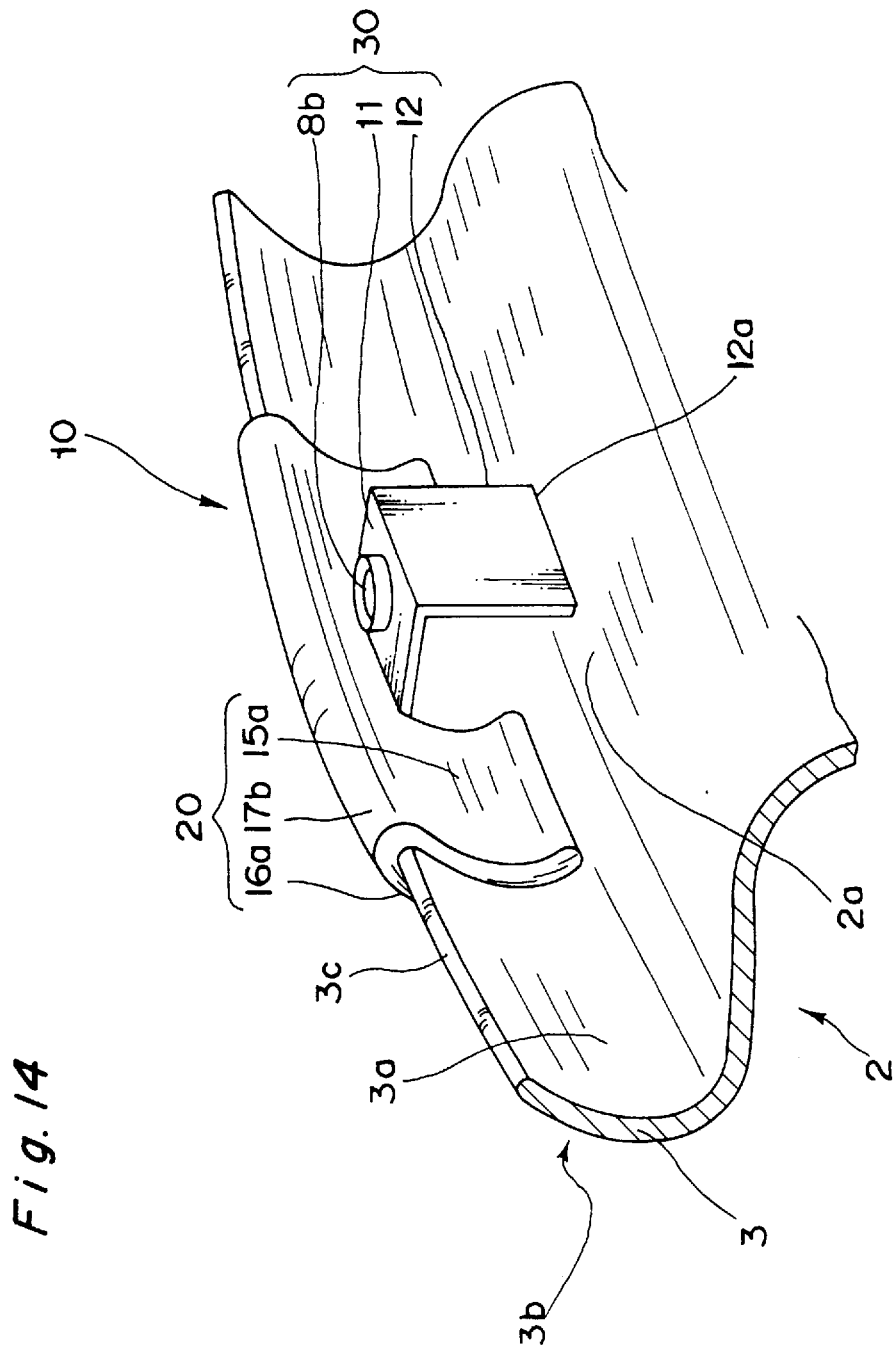
FIG. 14 is a perspective view showing a clip to be mounted on the wheel cover body shown in FIG. 13 has been installed on the rim flange.

FIG. 14 shows the clip 10 mounted on the rim flange 3 of the wheel 1. As shown in FIG. 14, the clip 10 comprises a sandwiching portion 20 fixed to the rim flange 3 of the wheel 1; and a pedestal 30 to which the female button 8b engaging the male button 8a installed on the underside of the wheel cover body 6 is fixed.

Similarly to the first embodiment, the sandwiching portion 20 comprises a first curved wall 15a curved along the inner surface 3a of the rim flange 3 curved in the sectional direction of the axis of the wheel 1; a second curved wall 16a curved along the outer surface 3b of the rim flange 3 curved in the sectional direction of the axis of the wheel 1; and a third curved wall 17b to be placed on the circumferential edge 3c of the rim flange 3 and interposed between the first curved wall 15a and the second curved wall 16a. The clip 10 is slightly curved in the longitudinal direction thereof in correspondence to the rim flange 3 curved in its circumferential direction.

Figure 15:
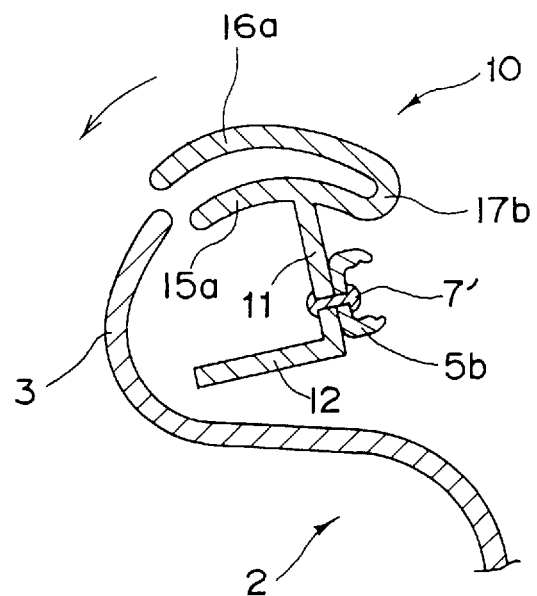
FIG. 15 is a sectional view for describing a method of mounting the clip shown in FIG. 14 on the rim flange.

The clip 10 consists of a material such as metal or plastic having a certain degree of elasticity. Similarly to the first embodiment, as shown in FIG. 15, the clip 10 is mounted on the rim flange 3 as follows: The rim flange 3 is inserted into the groove between the first curved wall 15a and the second curved wall 16a and then, the sandwiching portion 20 is moved in a direction shown by an arrow along the rim flange 3 curved in the sectional direction of the axis of the wheel 1. In this mounting operation, the first curved wall 15a and second curved wall 16a sandwich the rim flange 3 therebetween owing to the elastic force thereof. In this manner, the clip 10 is fixed to the rim flange 3.

As shown in FIG. 14, the pedestal 30 comprises a rectangular flat plate 11 parallel with the wheel cover surface and projecting inward in the radial direction of the wheel 1 from approximately the center of the first curved wall 15a; and a flat plate-shaped supporting leg 12 extending at a right angle with the flat plate 11 from the end of the flat plate 11 in its projection direction toward the inner surface 2a of the wheel rim. The female button 8b which engages the male button 8a mounted on the underside of the wheel cover body 6 is fixed to the upper surface of the flat plate 11. Similarly to the manner of mounting the male button 8a on the wheel cover body 6, the female button 8b is mounted on the upper surface of the flat plate 11 by caulking, utilizing a pin.

The position relationship among the wheel cover body 6, the clips 10, and the wheel 1 in mounting the wheel cover on the wheel 1 is as shown in FIG. 6, similarly to that of the first embodiment.

Similarly to the first embodiment, preferably, the clip 10 of the wheel cover is fixed to the rim flange 3 of the wheel 1 and then, the female button 8b fixed to the pedestal 30 of the clip 10 is engaged by the male button 8a fixed to the underside of the wheel cover body 6 so as to mount the wheel cover on the wheel 1. In this case, as indicated in FIG. 14, when the male button 8a presses the female button 8b downward, the lower end 12a of the flat plate-shaped supporting leg 12 extending from the flat plate 11 to which the female button 8b has been fixed toward the inner surface 2a of the rim flange 3 contacts the inner surface 2a. As a result, a reactive force is generated against the pressing force applied to the female button 8b by the male button 8a, thus allowing the male button 8a to easily engage the female button 8b.

As described above, the sandwiching portion 20 is fixed to the rim flange 3 by means of the first curved wall 15a and the second curved wall 16a which sandwich the rim flange 3 therebetween owing to the elastic force thereof. Thus, if there is a dislocation in the circumferential direction of the wheel 1 between the male button 8a fixed to the wheel cover body 6 and the female button 8b of the clip 10, the dislocation can be corrected by sliding the clip 10 along the rim flange 3 in the circumferential direction thereof.

Figure 16:
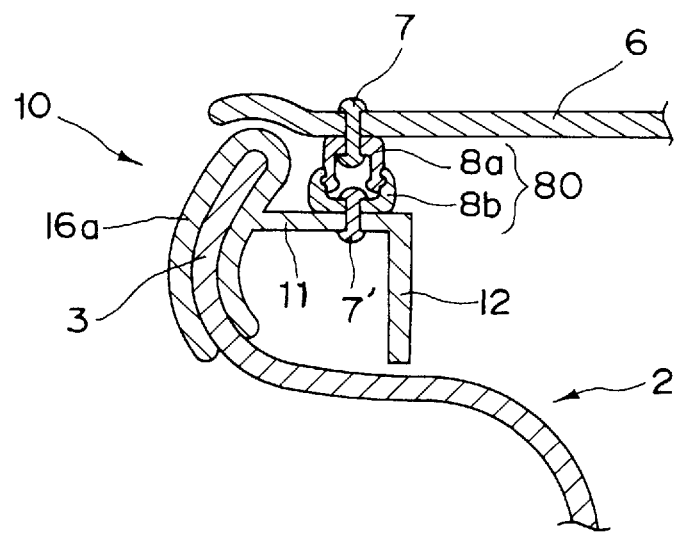
FIG. 16 is sectional view showing a state in which the wheel cover has been installed on the wheel by using the clip of FIG. 14.

FIG. 16 is a sectional view showing a state in which the male button 8a has engaged the female button 8b, thus allowing the wheel cover to be mounted on the wheel 1.

Figure 18:
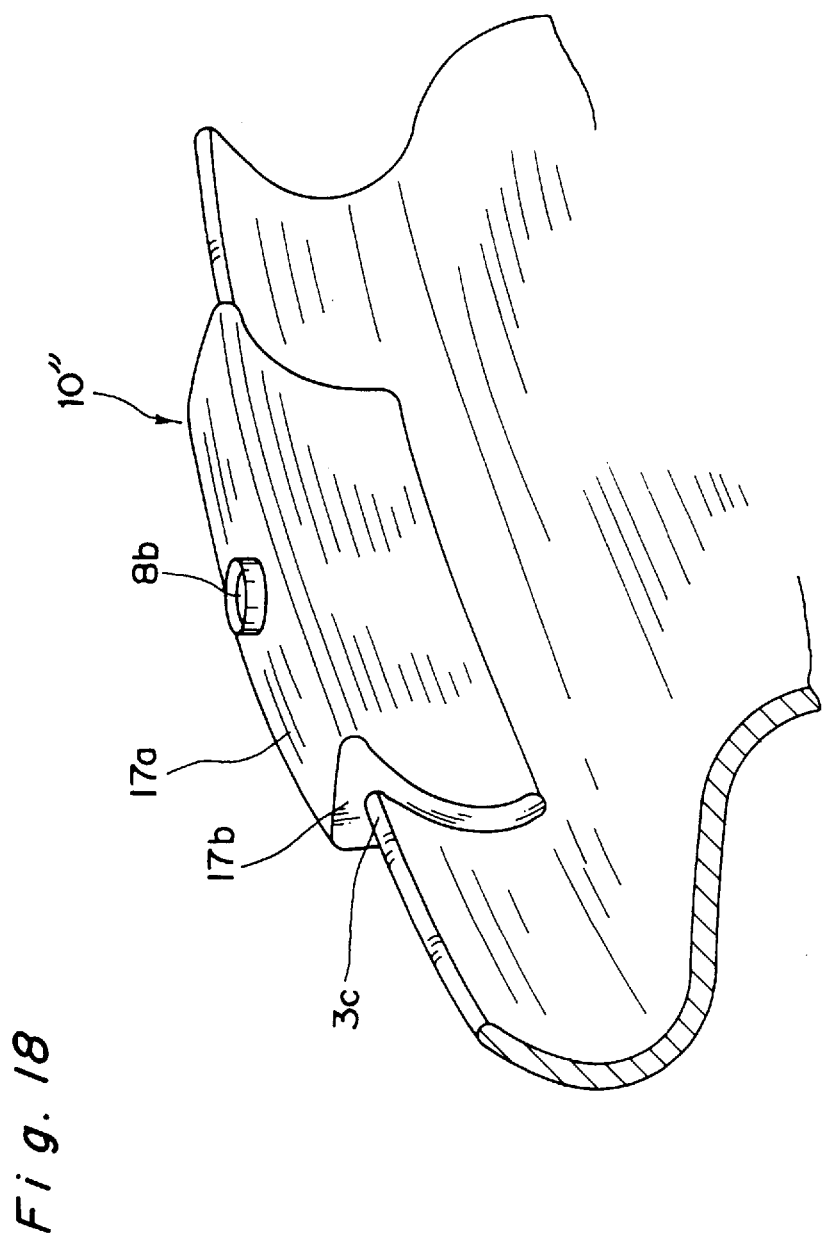
FIG. 18 is a perspective view showing still another example of clip, according to the present invention, which has been mounted on the rim flange.

FIGS. 17 and 18 show a modification of the clip 10, respectively. A clip 10' shown in FIG. 17 is made of a plastic material. As the supporting leg of the clip 10', there is formed a thick projected portion 25b which projects inward from the first curved wall 15a in the radial direction of the wheel 1. The thick projected portion 25b includes a plane portion 25a parallel with the surface of the wheel 1. The female button 8b is formed on the plane portion 25a.

A clip 10" shown in FIG. 18 is also made of a plastic material. The clip 10" does not have portions corresponding to the flat plate 11 and the supporting leg 12 of the clip 10 shown in FIG. 14 or the thick projected portion 25b of the clip 10' shown in FIG. 17. A top surface portion 17a having the length equal to the clip 10" is formed integrally with the third curved wall 17b interposed between the first curved wall 15a and the second curved wall 16a such that the top surface portion 17a is plane and extends in parallel with the surface of the wheel 1. The female button 8b is formed on the plane top surface portion 17a. In the example shown in FIG. 18, a reactive force against the pressing force applied to the female button 8b by the male button 8a is generated by the upper edge 3c of the rim flange 3 sandwiched between the first curved wall 15a and the second curved wall 16a.

Similarly to the clip 10, the clips 10' and 101" are curved slightly in the longitudinal direction thereof. As shown in FIGS. 17 and 18, the sectional configuration of the clips 10' and 10" are the same, respectively at any positions in the longitudinal direction thereof. Thus, the clips 10' and 10" can be easily formed by curling injection molding to be performed by using a curved cylindrical die.

The wheel cover according to the fifth embodiment of the present invention will be described below with reference to FIGS. 19 and 20. In the above-described fourth embodiment, the snap button comprising the male button and the female button are used as the snap engaging means, and the female button (or male button) is fixed to each clip. In the fifth embodiment, a male engaging portion (or female engaging portion) is formed integrally with the clip, and a female engaging portion (or male engaging portion) which is engaged by the male engaging portion is formed on the disc-shaped wheel cover. The order of installing the wheel cover on the wheel and the operation and effect thereof according to the fifth embodiment are similar to those of the fourth embodiment.

Figure 19A:
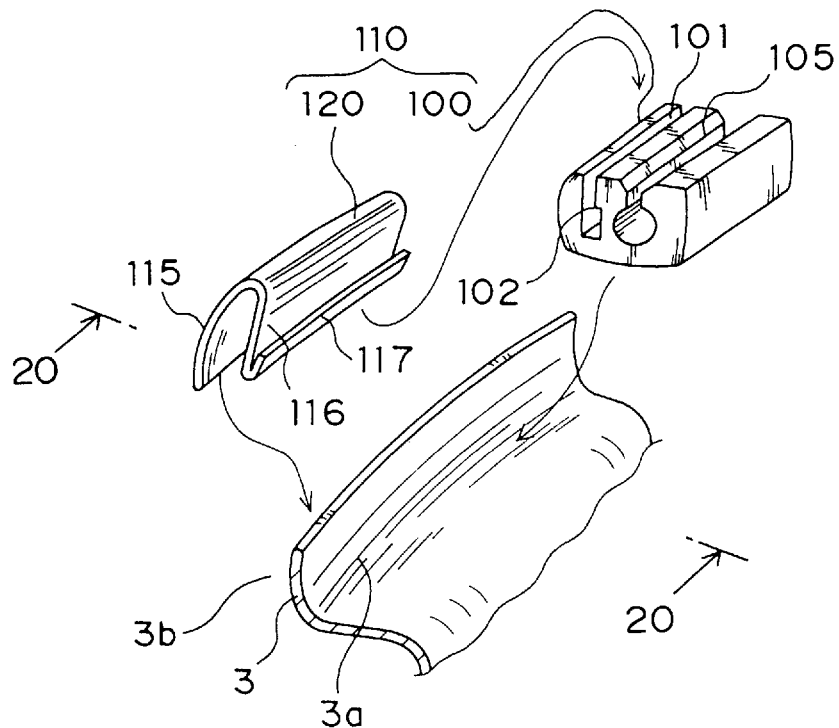
FIG. 19A is a perspective view showing a clip, according to a fifth embodiment of the present invention, formed integrally with a female engaging portion.

A clip 110 shown in FIG. 19A comprises a main body 100 having a female engaging portion 105 formed in integration therewith; and a sandwiching fitting 120 which sandwiches the rim flange 3 between it and a part of the main body 100.

The sandwiching metal fitting 120 is approximately U-shaped in section and comprises a first curved wall 115 curved in correspondence to the curved outer surface 3b of the rim flange 3 and a second curved wall 116 which engages the clip main body 100. The lower end of the second curved wall 116 is folded to form a folded portion 117.

The clip main body 100 is formed by extrusion molding of plastic resin and curved in correspondence to the curved inner surface 3a of the rim flange 3. A groove 101 and the female engaging portion 105 both extending in the longitudinal direction of the clip main body 100 are defined on the upper surface thereof. The groove 101 engages the second curved wall 116 of the sandwiching metal fitting 120. A stepped shoulder 102 is formed on a wall of the groove 101. The folded portion 117 of the second curved wall 116 inserted into the groove 101 engages the shoulder 102, thus preventing the sandwiching metal fitting 120 from being removed from the clip main body 100.

In the example shown in FIG. 19A, the clip 110 comprises the clip main body 100 and the sandwiching metal fitting 120 separate from the clip main body 100, but the entire clip may be integrally formed by molding resin.

Figure 19B:
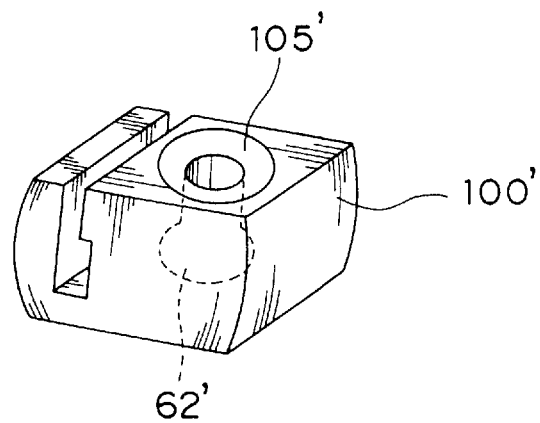
FIG. 19B is a perspective view showing a modification of the clip main body shown in FIG. 19A.
Figure 20:
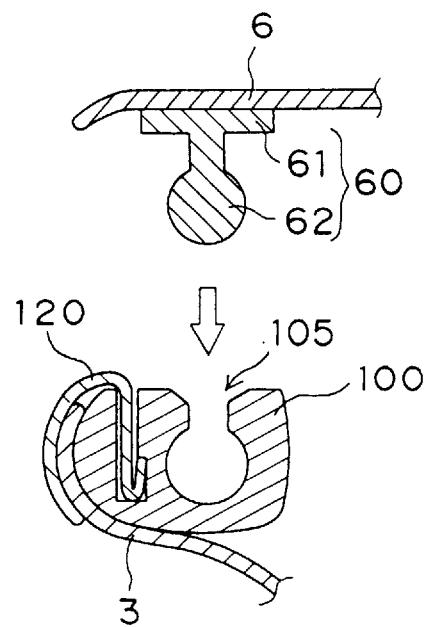
FIG. 20 is a sectional view taken along a line 20—20 of FIG. 19A.

FIG. 20 is a sectional view, taken along a line 20—20 of FIG. 19, showing the clip 110 in a state in which the clip 110 has been fixed to the rim flange 3. FIG. 20 also shows a male member 60 which engages the female engaging portion 105 of the clip 110. As in the case of the male button 8a, the male member 60 is fixed to the underside of the wheel cover body 6 at a position a little inward from the circumference thereof.

The male member 60 is elastic and composed of a flat pedestal 61 and a projection 62 projecting from the pedestal 61 and having a spherical portion at its lower portion. The male member 60 is bonded to the underside of the wheel cover body 6 with adhesive agent applied to the underside of the pedestal 61. The male member 60 may be welded to the underside of the wheel cover body 6. The male member 60 is separate from the wheel cover body 6 in this embodiment, but may be formed integrally with the wheel cover body 6.

As indicated in FIGS. 19A and 20, because the female engaging portion 105 consists of a groove circular in section and extending in the longitudinal direction of the clip main body 100, the wheel cover body 6 can be fixed to the clip 110, i.e., the wheel cover can be fixed to the rim flange 3 by elastically engaging the projection 62 of the male member 60 with the female engaging portion 105.

FIG. 19B is a perspective view showing a modification of the clip main body 100. The shape of the female engaging portion 105' of the clip main body 100' is different from that of the clip main body 100 shown in FIG. 19A. That is, the female engaging portion 105' of the clip main body 100' is not groove-shaped but formed as a concave portion circular in a plan view. A spherical space 62' which elastically engages the spherical portion of the projection 62 of the male member 60 fixed to the underside of the clip main body 6 is formed at the lower portion of the female engaging portion 105'.

When the clip main body 100' shown in FIG. 19B is used, the projection 62 of the male engaging portion 60 is required to be a bar-shaped member having the spherical portion 62 at its lower end. When the clip main body 100 having the groove-shaped female engaging portion extending in its longitudinal direction is used, the projection of the male engaging portion 60 is not necessarily bar-shaped. That is, it is possible to use a male engaging portion having a configuration similar in section to the bar-shaped member having the spherical portion at its lower end and having a certain length in correspondence to the groove-shaped female engaging portion. Further, the groove-shaped female engaging portion allows the projection of the male engaging portion to be fitted therein easily.

In the above-described embodiments, the male engaging portion is formed on the wheel cover body and the female engaging portion is formed on the clip. But it is possible to form the female engaging portion on the wheel cover body and the male engaging portion on the clip. Needless to say, the effect obtained by the latter construction is similar to that obtained by the former construction.

As described previously, the conventional wheel cover body is formed by injection molding of plastic without exception. The wheel cover body according to the present invention has a simple construction, as apparent from the foregoing description. A disc-shaped wheel cover body having a novel construction will be described below with reference to FIGS. 21 and 22.

Figure 21:
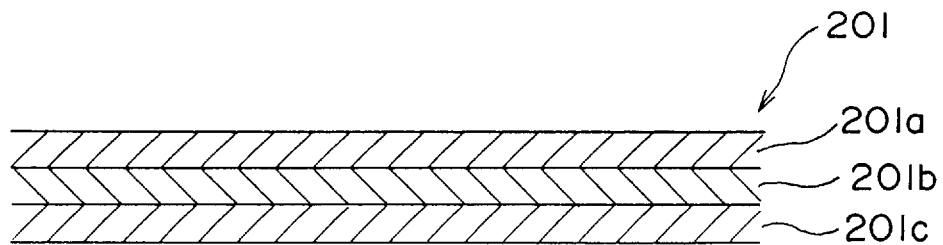
FIG. 21 is an enlarged sectional view showing the laminated structure of a three-laminate sheet to be used as a material of a wheel cover body according to an embodiment of the present invention.

FIG. 21 shows a laminated structure of a three-laminate sheet 201 to be used as the material of a wheel cover body. The three-laminate sheet 201 comprises a transparent protection layer 201a, a decoration layer 201b, and a heat-resistant reinforcing layer 201c. Needless to say, the transparent protection layer 201a forms the surface of the three-laminate sheet 201, while the heat-resistant reinforcing layer 201c forms the lower surface thereof.

Acrylic resin, polycarbonate, ABS resin are preferably used as the material of the transparent protection layer 201a. Materials similar to those of the transparent protection layer 201a are used to compose the decoration layer 201b, but normally, the material of the transparent protection layer 201a contains colored toner or metallic powder of such as aluminum powder in addition to the colored toner. Heat-resistant ABS resin, acrylic resin or polycarbonate is preferably used as the material of the heat-resistant reinforcing layer 201c. The heat-resistant reinforcing layer 201c is required to withstand heat transmitted from the wheel which is generated when the brake is applied.

As methods of manufacturing the wheel cover or the wheel cover body, using the three-layer laminate sheet 201, vacuum forming method shown in FIG. 22 or press molding method shown in FIG. 23 is used. The vacuum forming method will be described below before the press molding method is described.

Figures 22A, 22B:
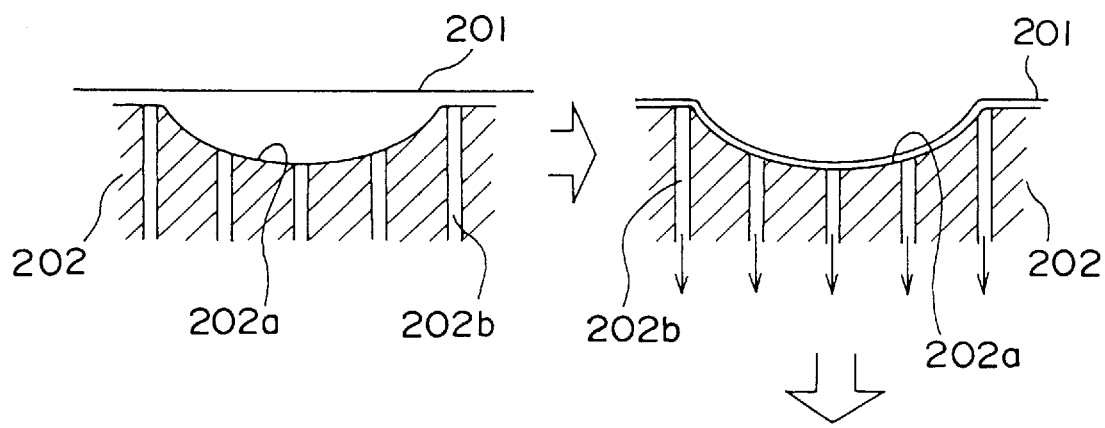
FIGS. 22A, 22B, and 22C are process views showing a method of performing vacuum molding, using the three-laminate sheet shown in FIG. 21.

In the vacuum forming method, a vacuum forming die 202 called a female die is used. The vacuum forming die 202 has a surface 202a corresponding to the curved surface of the wheel cover and sucking holes 202b formed thereon. As shown in FIG. 22A, first, the three-laminate sheet 201 is placed on the vacuum forming die 202. Then, as shown in FIG. 22B, air inside the vacuum forming die 202 is sucked from the sucking holes 202b to lay the three-laminate sheet 201 along the surface 202a. At this time, the three-laminate sheet 201 is heated as necessary. If the three-laminate sheet 201 is drawn at a low degree, it can be molded in the cold, whereas if the three-laminate sheet 201 is drawn at a high degree, it is required to be heated. Thereafter, the three-laminate sheet 201 which has been molded into a desired configuration is taken out from the vacuum forming die 202, and then, unnecessary portion is cut off from the three-laminate sheet 201. In this manner, a wheel cover body 204 is obtained.

Figure 22C:
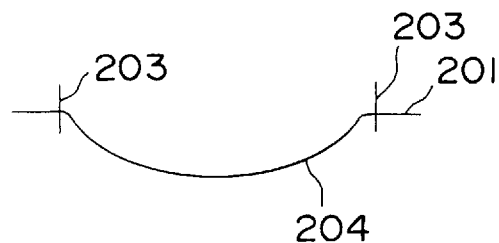
Figure 23A:
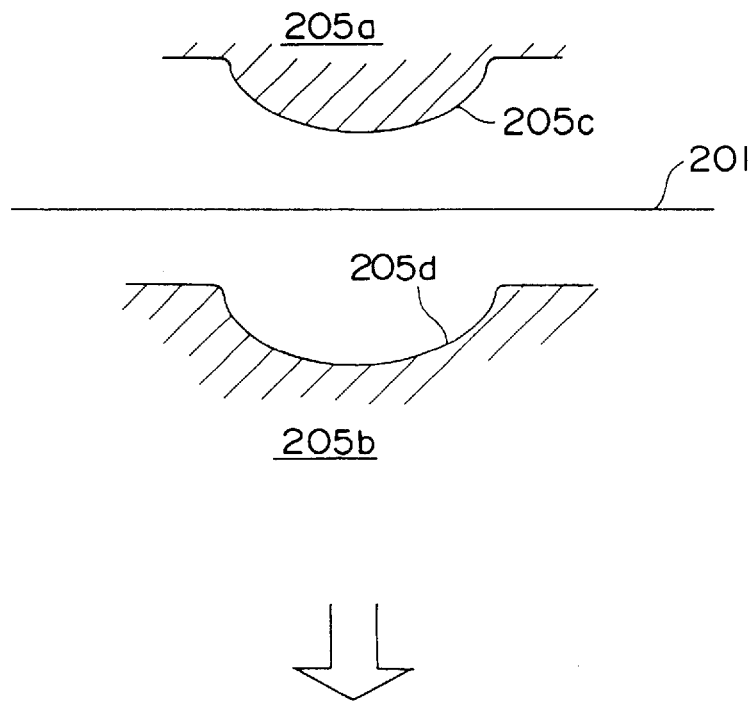
FIGS. 23A and 23B are process views showing a process for performing press molding, using the three-laminate sheet shown in FIG. 21.
Figure 23B:
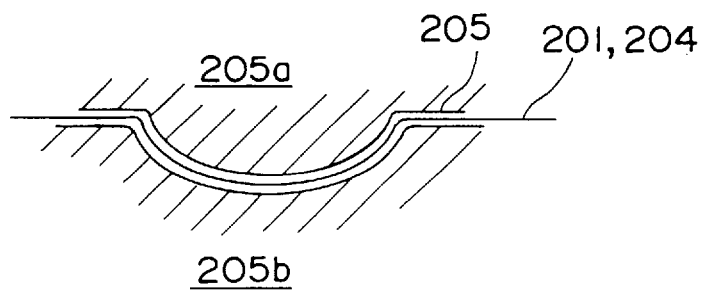

The press molding method is described below with reference to FIG. 23. As shown in FIG. 23A, the three-laminate sheet 201 is placed over a lower die 205b of a press die 205. The lower die 205b and an upper die 205a have a surface 205d and 205c, respectively corresponding to the curved surface of a wheel cover. Then, as shown in FIG. 23B, the upper die 205a is moved downward to sandwich the three-laminate sheet 201 between the upper die 205a and the lower die 205b. Then, the three-laminate sheet 201 is heated as necessary, with the three-laminate sheet 201 being pressed against the lower die 205b by the upper die 205a. In this manner, a wheel cover body, namely, the wheel cover body 204 similar to the one shown in FIG. 22C is obtained.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A wheel cover for a wheel of an automobile comprising:

a disc-shaped wheel cover body;

a plurality of clips, each clip includes a planar member and a first and second wall sandwiching a rim flange of the wheel, each wall includes a free end and a fixed end, said first wall includes a first curved portion with a first orientation and a first curvature, said second wall includes a second curved portion with a second orientation and a second curvature, said planar member is disposed adjacent to each fixed end of said first and second walls, said first curvature and said first orientation are substantially equal to said second curvature and said second orientation so that each free end of each wall is substantially aligned in a parallel manner with the other free end, the clips are fixed at positions proximate to a peripheral edge of the disc-shaped wheel cover body, with the clips spaced at predetermined intervals;

a plurality of first engaging means disposed at positions proximate to a peripheral edge of an underside of the disc-shaped wheel cover body, with the first engaging means spaced at predetermined intervals in the circumferential direction of the disc-shaped wheel cover body; and second engaging means disposed on a planar member of each clip so that the second engaging means engages the first engaging means, said first and said second engaging means include deformable mushroom-shaped projections whereby said clips provide increased mechanical efficiency for attachment to the rim flange of the wheel.

2. The wheel cover according to claim 1, wherein each clip has a pedestal formed continuously with the sandwiching portion; the pedestal has a flat portion having the second engaging means formed thereon; and the flat portion extends in parallel with a wheel cover surface and inward in the radial direction of the wheel.

3. The wheel cover according to claim 2, wherein each clip has a supporting leg extending in proximity to an inner surface of the rim when the wheel cover has been mounted on the wheel.

4. The wheel cover according to claim 1, wherein each clip includes an elastic thin plate with two legs, composed of a material different from that of the pedestal, for elastically sandwiching the rim flange of the wheel and a part of the clip between said two legs.

5. The wheel cover according to claim 4 wherein the elastic thin plate consists of a metal plate; and the pedestal is made of synthetic resin.

6. The wheel cover according to claim 1, wherein each clip includes a top surface of a connection wall connecting the first wall and the second wall with each other which is parallel with the surface of the wheel cover; and the second engaging means is mounted on the top surface of the connection wall.

* * * * *